United States Patent
Taherzadeh Boroujeni et al.

(10) Patent No.: US 11,968,663 B2
(45) Date of Patent: Apr. 23, 2024

(54) UPLINK TRANSMISSION HANDLING DURING TIME INTERVAL ASSOCIATED WITH DOWNLINK PHASE CONTINUITY

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 17/451,060

(22) Filed: Oct. 15, 2021

(65) Prior Publication Data

US 2023/0120692 A1    Apr. 20, 2023

(51) Int. Cl.
*H04W 72/1268* (2023.01)
*H04W 72/12* (2023.01)
*H04W 72/23* (2023.01)
*H04W 74/00* (2009.01)

(52) U.S. Cl.
CPC ....... *H04W 72/1268* (2013.01); *H04W 72/12* (2013.01); *H04W 72/23* (2023.01); *H04W 74/006* (2013.01)

(58) Field of Classification Search
None
See application file for complete search history.

(56) References Cited

U.S. PATENT DOCUMENTS

| | | | |
|---|---|---|---|
| 2021/0392679 A1* | 12/2021 | Kim | H04W 24/10 |
| 2022/0086772 A1* | 3/2022 | Cozzo | H04W 52/08 |
| 2023/0057558 A1* | 2/2023 | Lim | H04W 8/24 |
| 2023/0216712 A1* | 7/2023 | Yao | H04L 5/0051 |
| | | | 370/328 |

* cited by examiner

*Primary Examiner* — Alex Skripnikov
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, from a base station, information indicating that a time interval is associated with downlink phase continuity. The UE may refrain from performing, during the time interval associated with downlink phase continuity, an uplink transmission associated with a time domain resource that occurs during the time interval associated with downlink phase continuity. Numerous other aspects are described.

30 Claims, 9 Drawing Sheets

UPLINK TRANSMISSION HANDLING DURING TIME INTERVAL ASSOCIATED WITH DOWNLINK PHASE CONTINUITY

FIELD OF THE DISCLOSURE

Aspects of the present disclosure generally relate to wireless communication and to techniques and apparatuses for uplink transmission handling during a time interval associated with downlink phase continuity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a base station, information indicating that a time interval is associated with downlink phase continuity. The method may include refraining from performing, during the time interval associated with downlink phase continuity, an uplink transmission associated with a time domain resource that occurs during the time interval associated with downlink phase continuity.

Some aspects described herein relate to a UE for wireless communication. The user equipment may include a memory and one or more processors coupled to the memory. The one or more processors may be configured to receive, from a base station, information indicating that a time interval is associated with downlink phase continuity. The one or more processors may be configured to refrain from performing, during the time interval associated with downlink phase continuity, an uplink transmission associated with a time domain resource that occurs during the time interval associated with downlink phase continuity.

Some aspects described herein relate to a non-transitory computer-readable medium that stores a set of instructions for wireless communication by a UE. The set of instructions, when executed by one or more processors of the UE, may cause the UE to receive, from a base station, information indicating that a time interval is associated with downlink phase continuity. The set of instructions, when executed by one or more processors of the UE, may cause the UE to refrain from performing, during the time interval associated with downlink phase continuity, an uplink transmission associated with a time domain resource that occurs during the time interval associated with downlink phase continuity.

Some aspects described herein relate to an apparatus for wireless communication. The apparatus may include means for receiving, from a base station, information indicating that a time interval is associated with downlink phase continuity. The apparatus may include means for refraining from performing, during the time interval associated with downlink phase continuity, an uplink transmission associated with a time domain resource that occurs during the time interval associated with downlink phase continuity.

Some aspects described herein relate to a method of wireless communication performed by a base station. The method may include transmitting, to a UE, information indicating that a time interval is associated with downlink phase continuity. The method may include transmitting, to the UE, an indication to skip or postpone uplink transmissions during the time interval associated with downlink phase continuity.

Some aspects described herein relate to a base station for wireless communication. The base station may include a memory and one or more processors coupled to the memory. The one or more processors may be configured to transmit, to a UE, information indicating that a time interval is associated with downlink phase continuity. The one or more processors may be configured to transmit, to the UE, an indication to skip or postpone uplink transmissions during the time interval associated with downlink phase continuity.

Some aspects described herein relate to a non-transitory computer-readable medium that stores a set of instructions for wireless communication by a base station. The set of instructions, when executed by one or more processors of the base station, may cause the base station to transmit, to a UE, information indicating that a time interval is associated with downlink phase continuity. The set of instructions, when executed by one or more processors of the base station, may cause the base station to transmit, to the UE, an indication to skip or postpone uplink transmissions during the time interval associated with downlink phase continuity.

Some aspects described herein relate to an apparatus for wireless communication. The apparatus may include means for transmitting, to a UE, information indicating that a time interval is associated with downlink phase continuity. The apparatus may include means for transmitting, to the UE, an indication to skip or postpone uplink transmissions during the time interval associated with downlink phase continuity.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
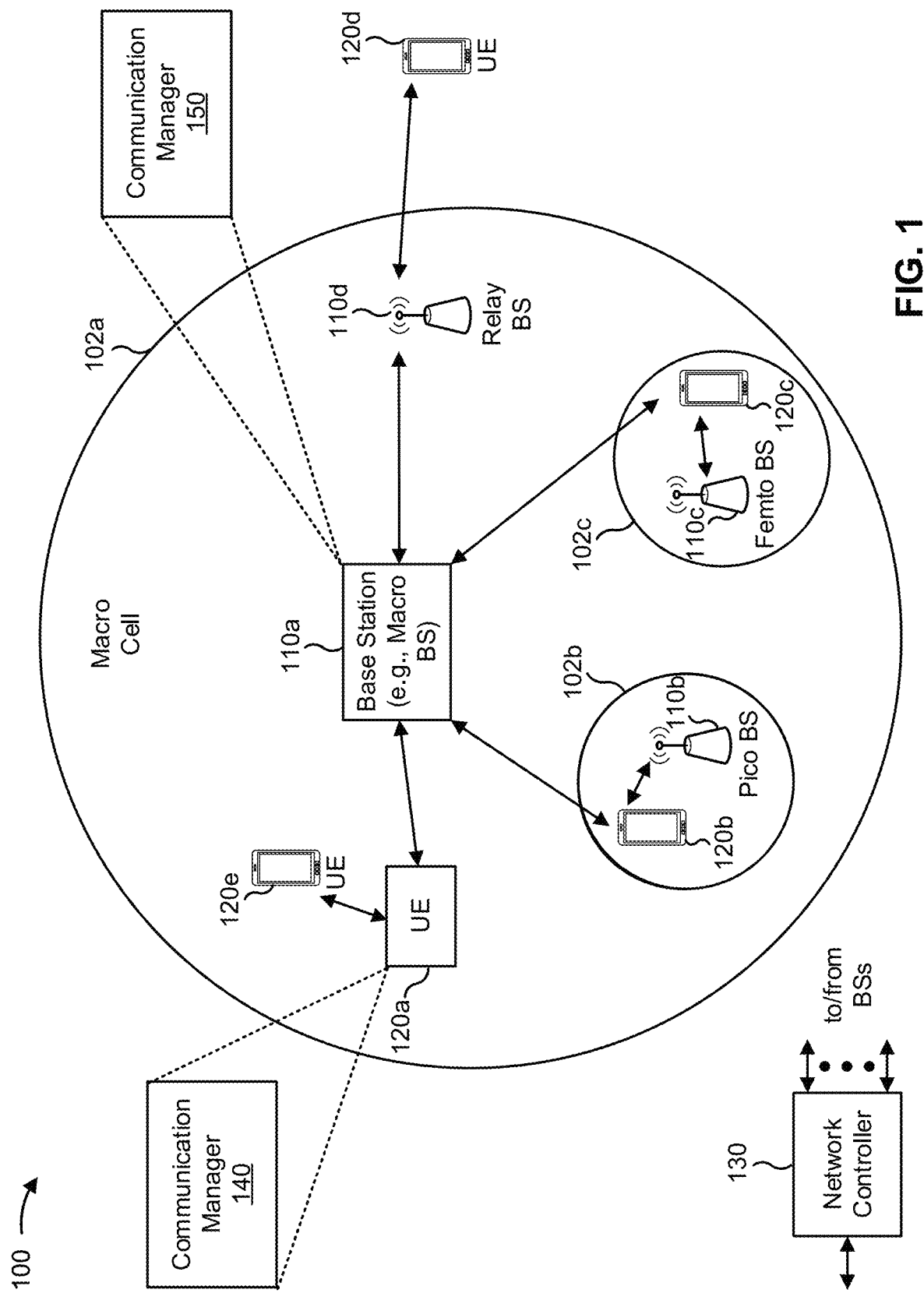
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicleto-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, information indicating that a time interval is associated with downlink phase continuity; and refrain from performing, during the time interval associated with downlink phase continuity, an uplink transmission associated with a time domain resource that occurs during the time interval associated with downlink phase continuity. Additionally, or alternatively, the communication manager 140 may perform one or more other operations described herein.

In some aspects, the base station 110 may include a communication manager 150. As described in more detail elsewhere herein, the communication manager 150 may transmit, to a UE 120, information indicating that a time interval is associated with downlink phase continuity; and transmit, to the UE 120, an indication to skip or postpone uplink transmissions during the time interval associated with downlink phase continuity. Additionally, or alternatively, the communication manager 140 may perform one or more other operations described herein.

As indicated above, FIG. 1 is provided as an example. Other examples may differ from what is described with regard to FIG. 1.

Figure 2:
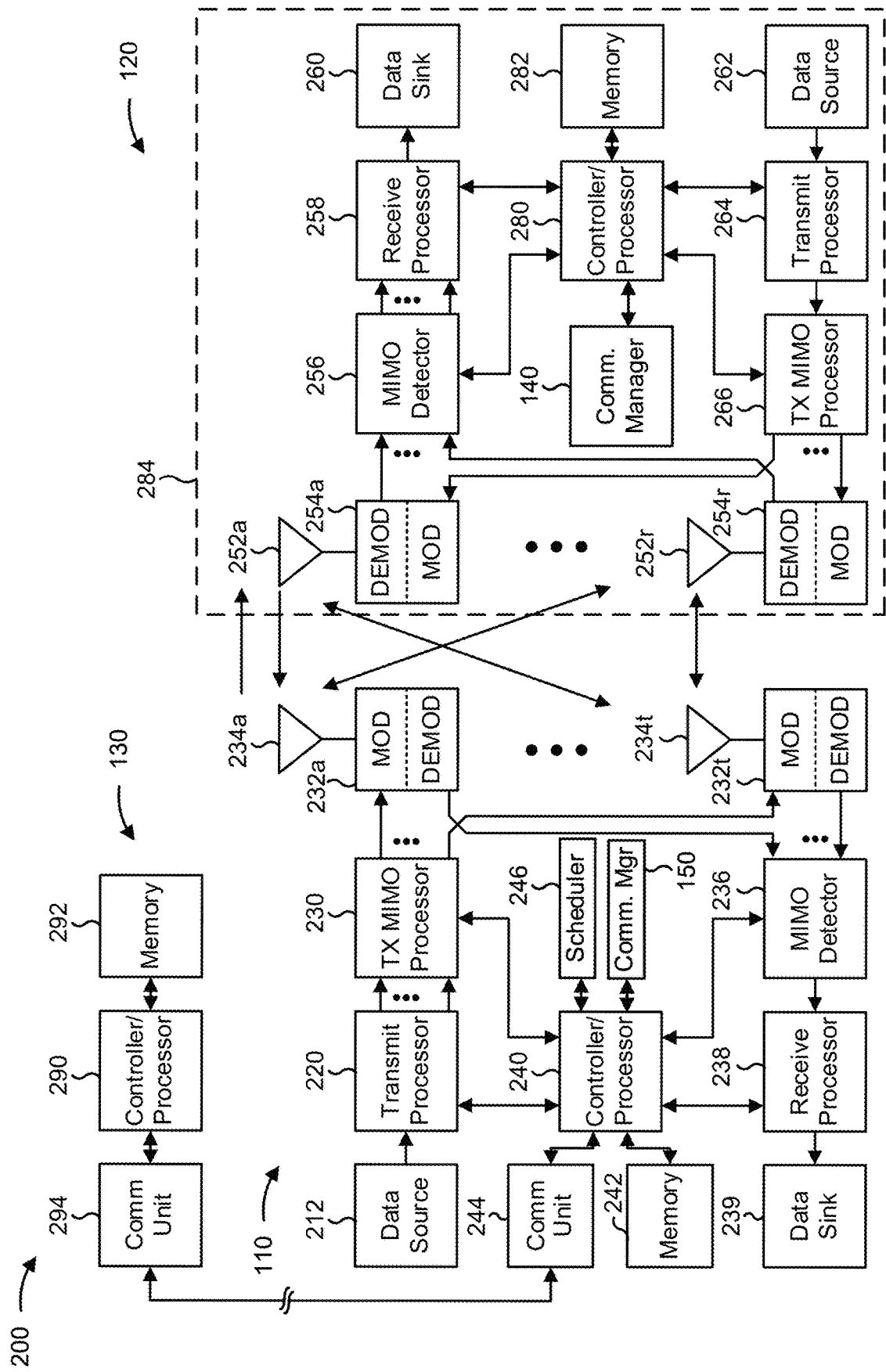
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with uplink transmission handling during a time interval associated with downlink phase continuity, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, the UE 120 includes means for receiving, from the base station 110, information indicating that a time interval is associated with downlink phase continuity; and/or means for refraining from performing, during the time interval associated with downlink phase continuity, an uplink transmission associated with a time domain resource that occurs during the time interval associated with downlink phase continuity. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to the UE 120, information indicating that a time interval is associated with downlink phase continuity; and/or means for transmitting, to the UE 120, an indication to skip or postpone uplink transmissions during the time interval associated with downlink phase continuity. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
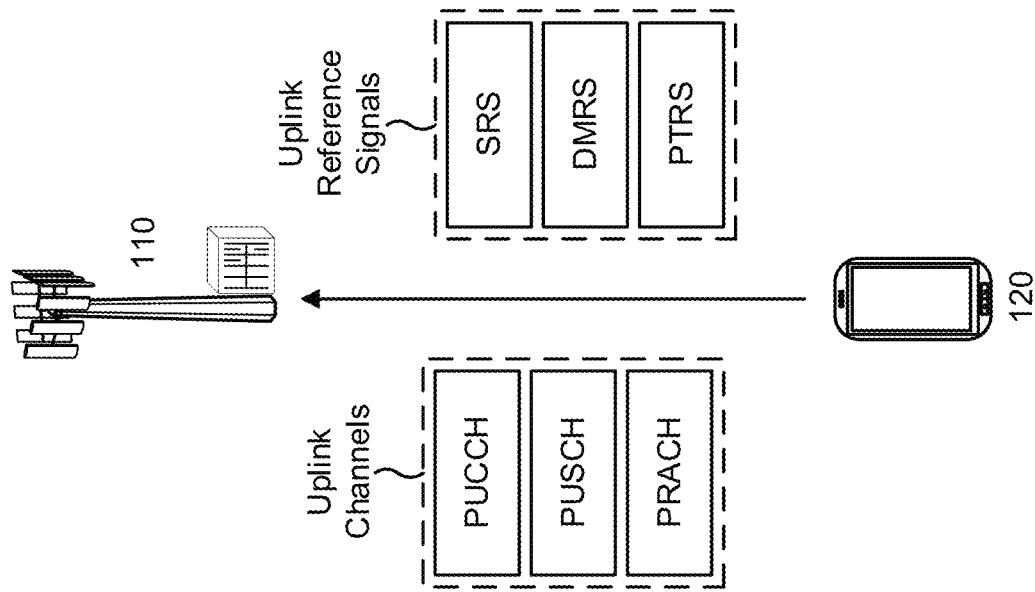
FIG. 3 is a diagram illustrating an example of physical channels and reference signals in a wireless network, in accordance with the present disclosure.
Figure 3:
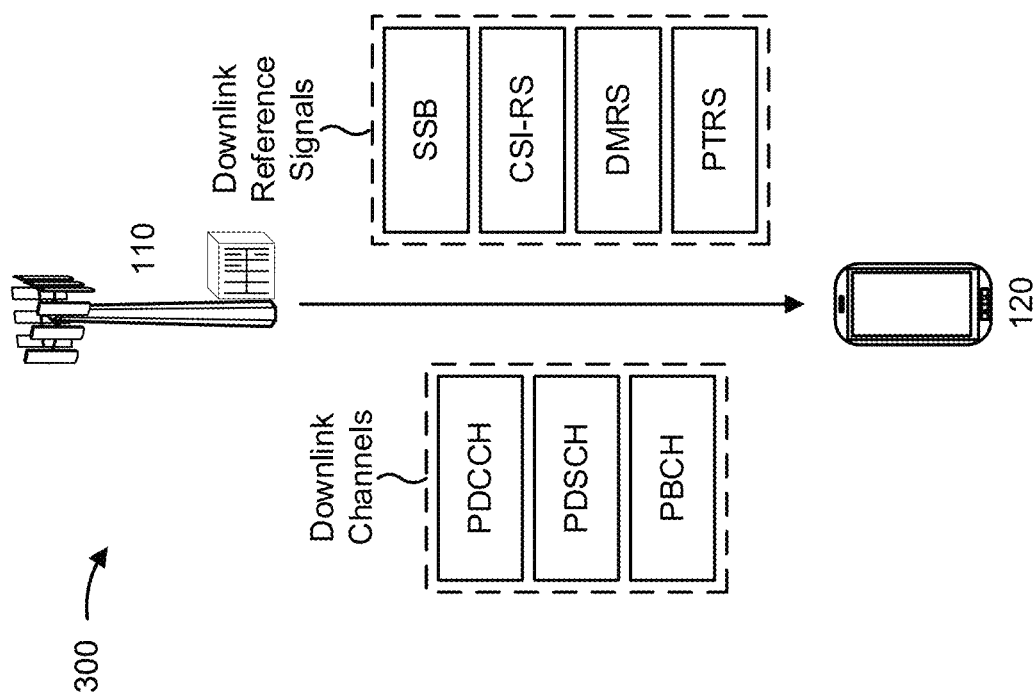

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation.

DMRSs are UE-specific, can be beamformed, can be confined in a scheduled resource (e.g., rather than transmitted on a wideband), and can be transmitted only when necessary. As shown, DMRSs are used for both downlink communications and uplink communications. Furthermore, in some cases, a wireless network may support DMRS bundling in a time domain (e.g., across one or more symbols or slots). In particular, DMRS bundling may allow a receiver (e.g., a UE in the case of downlink DMRS bundling or a base station in the case of uplink DMRS bundling) to assume phase continuity for the DMRS over aggregated symbols or slots in which the bundled DMRSs are transmitted. For example, when DMRS bundling is enabled or otherwise configured, the receiver may perform (joint) channel estimation based on DMRS(s) received across multiple symbols or slots, as opposed to performing channel estimation separately according to DMRS(s) received in individual symbols or consecutive symbols of the same channel in one or more slots. In this way, DMRS bundling may allow a receiver to coherently filter bundled DMRSs received in different symbols or slots, which improves channel estimation accuracy (especially in small bandwidth and/or low mobility scenarios).

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
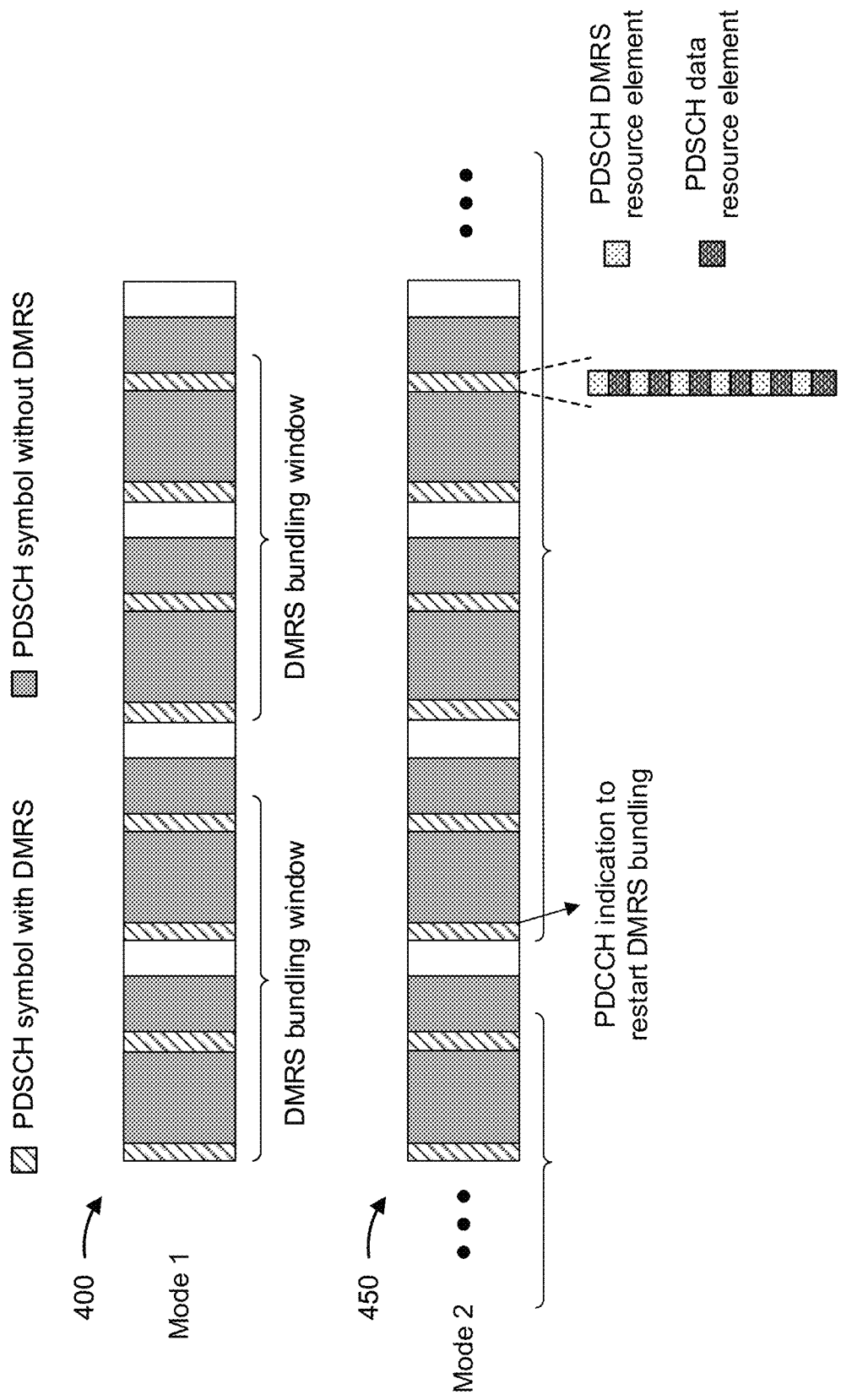
FIG. 4 is a diagram illustrating an example of downlink demodulation reference signal bundling, in accordance with the present disclosure.

FIG. 4 is a diagram illustrating examples 400, 450 of downlink DMRS bundling, in accordance with the present disclosure.

A transmitter, such as a base station, may transmit one or more DMRSs to a receiver, such as a UE. A DMRS may include a reference signal that is generated from a base sequence, such as a Zadoff-Chu sequence or a Gold sequence. The UE may perform one or more measurements of the DMRS to estimate a physical channel on which one or more communications are transmitted from the base station. In this way, the UE may determine whether a channel quality of the physical channel satisfies one or more channel quality thresholds and may use the results from the one or more measurements to demodulate the communications transmitted on the physical channel.

In some cases, the base station may associate or bundle multiple time domain resources (e.g., symbols that carry a DMRS) for purposes of downlink DMRS bundling, which permits DMRS symbols for different PDSCH occasions to be transmitted with phase coherence or phase continuity. In this case, the UE may assume that the same precoder is used across the DMRS symbols and that DMRS transmissions across the DMRS symbols may be coherently processed (e.g., coherently combined and/or coherently filtered) to increase channel estimation accuracy (e.g., by improving a signal-to-noise ratio (SNR), mean square error (MSE), and/or other quality of the DMRS), which may be useful to improve downlink performance (e.g., when a PDSCH is transmitted in multiple repetitions). For example, in FIG. 4, example 400 illustrates DMRS bundling performed in a first mode (referred to as Mode 1) and example 450 illustrates DMRS bundling performing in a second mode (referred to as Mode 2). As an example, FIG. 4 shows PDSCH mapping Type B, a single-symbol DMRS, DMRS Type 1, and two symbols per PDSCH slot.

As shown by example 400, Mode 1 may use a periodic DMRS bundling window. In this case, all DMRS symbols in the DMRS bundling window may be bundled. In Mode 1, the DMRS bundling window may include a configurable number of PDSCH occasions and/or a configurable number of slots, whereby a DMRS bundle may include multiple DMRS transmissions that occur in the DMRS symbols associated with the PDSCH occasions or within the configurable number of slots. Accordingly, in Mode 1, a UE may perform joint channel estimation based on DMRS transmissions that occur in all of the DMRS symbols within the periodic DMRS bundling window.

Additionally, or alternatively, as shown by example 450, Mode 2 may use a dynamic indication (e.g., in a PDCCH) to define a DMRS bundle boundary. For example, a base station may transmit, to a UE, an indication of when a new DMRS bundling window is to start or when an ongoing DMRS bundling window is to end (e.g., boundaries of a DMRS bundle are dynamically configured). In this case, a DMRS bundle may contain a varying number of PDSCH occasions, and the number of PDSCH occasions in a DMRS bundle is dynamically controlled by the PDCCH. Furthermore, in Mode 2, all DMRS symbols from a start of a DMRS bundle boundary to an end of the DMRS bundle boundary may be bundled. In other words, the PDCCH may indicate the start of the DMRS bundle boundary and the end of the DMRS bundle boundary, which together define a DMRS bundling window in which downlink phase continuity can be assumed. Accordingly, in Mode 2, different DMRS bundles may include different numbers of PDSCH occasions and/or different numbers of slots based on bundle boundaries that are dynamically indicated in a PDCCH.

As described above, a UE may coherently process multiple DMRS transmissions that are received in a DMRS bundling window based on an assumption that the base station will maintain phase continuity across the DMRS bundle. Accordingly, the UE may perform joint channel estimation based on bundled DMRS transmissions, which may improve downlink performance (e.g., improving decoding performance when a PDSCH is transmitted in multiple repetitions). However, whether a UE can support downlink DMRS bundling may depend on a capability of the base station to maintain downlink phase continuity (e.g., using the same digital precoding matrix, analog beamforming filter, downlink power, and/or other downlink transmission parameters) throughout a DMRS bundling window. For example, in some cases, the ability of a base station to maintain phase continuity over a DMRS bundling window may depend on whether bundled PDCCH and/or PDSCH transmissions are contiguous in a time domain during the DMRS bundling window and/or a length or usage associated with a gap between bundled PDCCH and/or PDSCH transmissions.

In some cases, one scenario that can adversely affect the ability of a base station to maintain phase continuity is having to perform an uplink reception operation between two downlink DMRS transmissions that are intended to be bundled (e.g., between two PDSCH repetitions or between two PDCCH repetitions that carry bundled DMRSs). To an extent, a base station may mitigate or avoid the adverse impact on downlink phase continuity by refraining from scheduling a dynamic PUSCH transmission and/or refraining from scheduling a PUCCH that carries hybrid automatic repeat request (HARD) feedback for a scheduled PDSCH during a time interval associated with downlink phase continuity (e.g., a downlink DMRS bundling window). However, a UE may be configured to perform various other uplink transmissions that are not dynamically scheduled. For example, a UE may not need a dynamic uplink grant in order to transmit a PUSCH using one or more configured grant (CG) uplink configurations, a scheduling request (SR) used to request a dynamic uplink grant, and/or a semi-persistent scheduling (SPS) PUCCH to carry UCI and/or other feedback associated with a downlink SPS transmission. In other words, refraining from dynamically scheduling a PUSCH or a PUCCH that includes HARQ feedback for a scheduled PDSCH may not fully prevent the UE from performing certain uplink transmissions during a time interval associated with downlink phase continuity. Accordingly, if a UE were to perform an uplink transmission (e.g., a CG-PUSCH transmission, an SR transmission, and/or an SPS PUCCH transmission, among other examples) during a downlink DMRS bundling window or other time interval associated with downlink phase continuity, the base station may be unable to maintain phase continuity due to the need to perform uplink reception between bundled DMRS transmissions. As a result, the UE may be unable to perform joint channel estimation for the bundled DMRS transmissions, which may degrade demodulation and/or decoding performance on the downlink.

Some aspects described herein relate to techniques and apparatuses to handle uplink transmissions that occur during a time interval associated with downlink phase continuity (e.g., a downlink DMRS bundling window). For example, in some aspects, a UE may drop, postpone, and/or deprioritize one or more uplink transmissions (e.g., PUCCH transmissions and/or PUSCH transmissions) associated with a time domain resource that occurs during a time interval associated with downlink phase continuity. For example, in some aspects, a base station may transmit a radio resource control (RRC) configuration and/or DCI that includes an indication to drop and/or postpone uplink transmissions that occur between downlink DMRS transmissions, PDSCH repetitions, and/or other downlink transmissions associated with downlink phase continuity. Accordingly, in some aspects, a UE may determine that a time interval associated with downlink phase continuity has started, and may drop and/or postpone an uplink transmission during the time interval associated with downlink phase continuity. In this way, some aspects described herein may enable the base station to maintain phase continuity throughout a DMRS bundling window, which may facilitate joint downlink channel estimation by the UE and thereby increase demodulation and/or decoding performance for downlink communication.

As indicated above, FIG. 4 is provided as an example. Other examples may differ from what is described with respect to FIG. 4.

Figure 5:
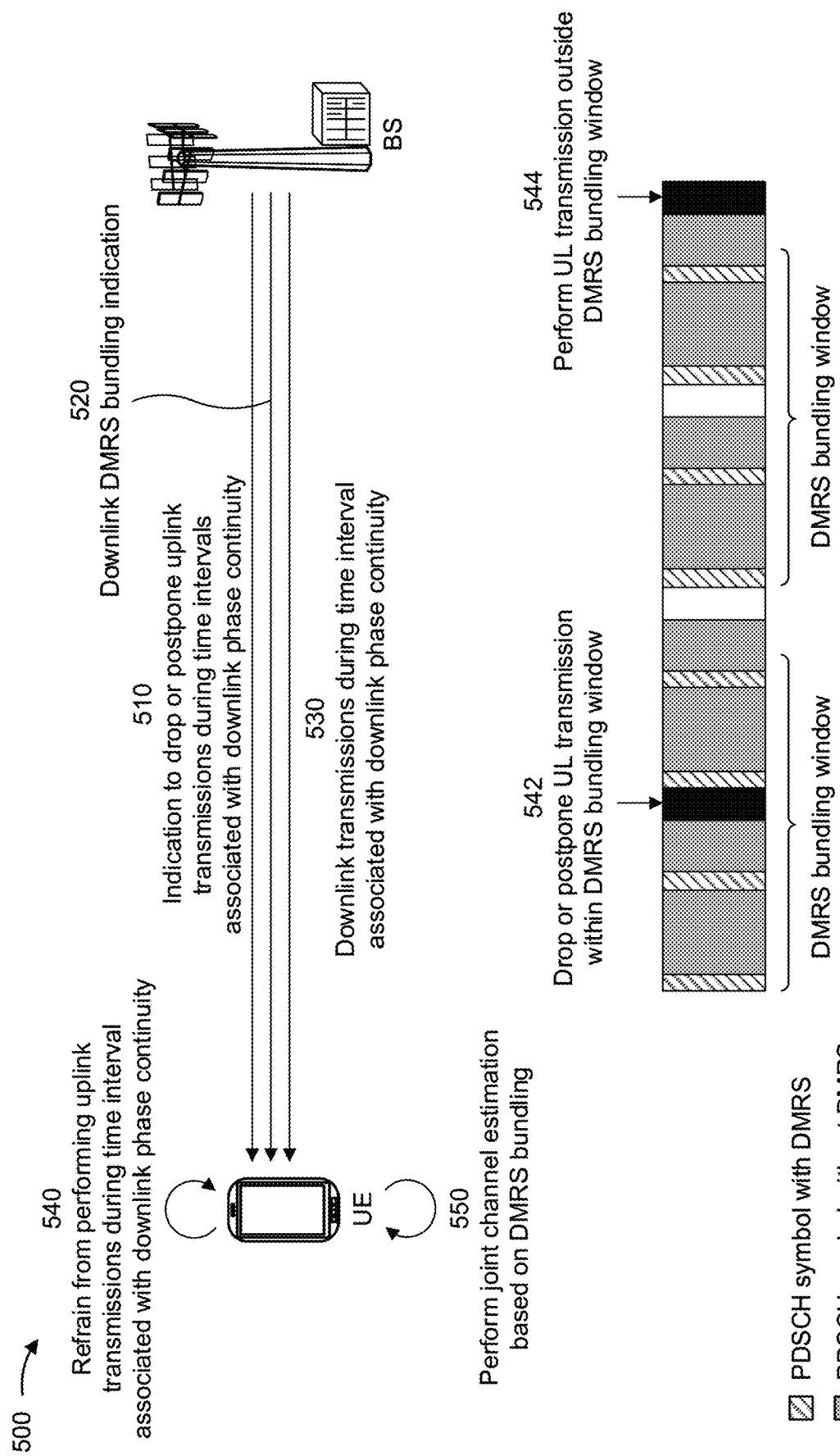
FIG. 5 is a diagram illustrating an example associated with uplink transmission handling during a time interval associated with downlink phase continuity, in accordance with the present disclosure.

FIG. 5 is a diagram illustrating an example 500 associated with uplink transmission handling during a time interval associated with downlink phase continuity, in accordance with the present disclosure. As shown in FIG. 5, example 500 includes communication between a base station (e.g., base station 110) and a UE (e.g., UE 120). In some aspects, the base station and the UE may be included in a wireless network, such as wireless network 100. The base station and the UE may communicate via a wireless access link, which may include an uplink and a downlink.

As shown in FIG. 5, and by reference number 510, the base station may transmit, and the UE may receive, an indication to drop or postpone uplink transmissions that are associated with time domain resources that occur during time intervals associated with downlink phase continuity. For example, as described herein, a time interval associated with downlink phase continuity may generally include a downlink DMRS bundling window, which may include contiguous time domain resources (e.g., a number of consecutive slots and/or symbols) over which the base station maintains phase continuity for downlink transmissions. For example, in some aspects, the downlink DMRS bundling window may include multiple downlink DMRS transmissions that are associated with different repetitions of a PDSCH and/or a PDCCH (e.g., an initial transmission of a PDSCH and/or a PDCCH and one or more retransmissions of the PDSCH and/or PDCCH). Additionally, or alternatively, the downlink DMRS bundling window may include multiple downlink DMRS transmissions that are associated with different PDSCH transmissions (e.g., carrying different transport blocks) and/or different PDCCH transmissions (e.g., carrying different control information).

In some aspects, the indication to skip or postpone uplink transmissions associated with time domain resources that occur during time intervals associated with downlink phase continuity may be provided in an RRC configuration. For example, in some aspects, the base station may transmit an RRC configuration for a CG uplink, and the RRC configuration may include one or more parameters to indicate that the UE is to skip or postpone a CG uplink transmission associated with a time domain resource that occurs during a time interval associated with downlink phase continuity. Additionally, or alternatively, the base station may transmit an RRC configuration associated with an SPS configuration (e.g., downlink transmissions without a dynamic downlink grant), and the RRC configuration may indicate that the UE is to skip or postpone SPS PUCCH transmissions that include HARQ feedback for downlink transmissions associated with the SPS configuration in cases where the SPS PUCCH transmission is associated with a time domain resource that occurs during a time interval associated with downlink phase continuity. Additionally, or alternatively, the RRC configuration may indicate that the UE is to skip or postpone SPS PUCCH transmissions associated with time domain resources that occur during time intervals associated with downlink phase continuity in cases for an SPS configuration associated with PDSCH repetitions. Additionally, or alternatively, the RRC configuration may include a PUCCH resource set configuration indicating that the UE is to skip or postpone SPS PUCCH and/or SR transmissions during time intervals associated with downlink phase continuity.

In some aspects, the indication to skip or postpone uplink transmissions associated with time domain resources that occur during time intervals associated with downlink phase continuity may be provided in DCI. For example, in some aspects, the base station may transmit DCI that carries an indication that the UE is to skip or postpone CG uplink transmissions, SR transmissions, and/or SPS PUCCH transmissions that are associated with time domain resources that occur during time intervals associated with downlink phase continuity (e.g., during a DMRS bundling window and/or between PDSCH repetitions). For example, in some aspects, the indication to skip or postpone CG uplink transmissions, SR transmissions, and/or SPS PUCCH transmissions that are associated with time domain resources that occur during time intervals associated with downlink phase continuity may be carried in DCI that activates an SPS configuration, DCI that schedules a PDSCH, and/or DCI that schedules a PDSCH with multiple repetitions, among other examples.

As further shown in FIG. 5, and by reference number 520, the base station may transmit, and the UE may receive, a DMRS bundling indication or other suitable information indicating one or more time intervals that are associated with downlink phase continuity. In some aspects, the indication may configure downlink DMRS bundling according to a Mode 1 configuration. For example, the downlink DMRS bundling indication may define a periodic DMRS bundling window in which all DMRS symbols are bundled, and the UE can perform joint channel estimation based on all the bundled DMRS symbols within the periodic DMRS bundling window. Additionally, or alternatively, the indication may configure downlink DMRS bundling according to a Mode 2 configuration. For example, the indication may be carried in a PDCCH that defines a DMRS bundle boundary, in which case the UE may perform joint downlink channel estimation based on all DMRS symbols from a start of a DMRS bundle boundary to an end of the DMRS bundle boundary. Accordingly, as described herein, the base station may configure one or more periodic DMRS bundling windows and/or one or more dynamic DMRS bundling windows, during which the UE can perform joint channel estimation based on bundled DMRS transmissions associated with different repetitions of a PDSCH and/or PDCCH transmissions and/or different PDSCH and/or PDCCH transmissions.

As further shown in FIG. 5, and by reference number 530, the base station may perform downlink transmissions during the time interval associated with downlink phase continuity. For example, in some aspects, the base station may use the same digital precoding matrix, analog beamforming filter, downlink power, and/or other transmission parameters for all downlink transmissions that occur during the time interval associated with downlink phase continuity. In some aspects, the downlink transmissions that occur during the time interval associated with downlink phase continuity may include multiple PDSCH and/or PDCCH symbols that carry one or more DMRS resource elements and one or more PDSCH and/or PDCCH resource elements. In addition, the downlink transmissions that occur during the time interval associated with downlink phase continuity may include one or more PDSCH and/or PDCCH symbols that carry only a PDSCH and/or PDCCH payload.

As further shown in FIG. 5, and by reference number 540, the UE may refrain from performing one or more uplink transmissions during the interval associated with downlink phase continuity. For example, as described above, the base station may generally avoid scheduling a PUSCH and/or a PUCCH that includes HARQ feedback for a scheduled PDSCH during the time interval associated with downlink phase continuity. However, the UE may be configured to perform other uplink transmissions without an uplink grant, such as a CG-PUSCH transmission, an SR transmission, and/or an SPS PUCCH transmission. Accordingly, in some aspects, the UE may refrain from performing one or more CG-PUSCH, SR, and/or SPS transmissions that are associated with time domain resources that occur during the time interval associated with downlink phase continuity. For example, reference number 542 illustrates an example where the UE may be configured to perform a CG-PUSCH, SR, and/or SPS transmission, which the UE may drop or postpone based on the CG-PUSCH, SR, and/or SPS transmission occurring during a DMRS bundling window (e.g., between PDSCH repetitions).

For example, the UE may drop the uplink transmission in cases where the uplink transmission is a CG-PUSCH. Additionally, or alternatively, the UE may postpone the uplink transmission until after the time interval associated with downlink phase continuity has elapsed in cases where the uplink transmission is an SPS PUCCH. For example, as shown by reference number 544, the UE may perform the uplink transmission at a later time, after the DMRS bundling window has elapsed. Additionally, or alternatively, the UE may determine whether to drop or postpone the uplink transmission based on an RRC configuration and/or DCI indication, as described above. In some aspects, the UE may refrain from performing the uplink transmission based on a priority of an associated logical channel. For example, the UE may drop or postpone a CG-PUSCH transmission associated with a logical channel having a priority that fails to satisfy a threshold. Alternatively, in cases where a CG-PUSCH transmission is associated with a logical channel having a priority that satisfies the threshold, the UE may perform the CG-PUSCH transmission (although performing the CG-PUSCH transmission may disrupt transmission phase continuity at the base station).

In this way, as shown by reference number 550, the UE may be able to perform joint channel estimation based on bundled DMRS transmissions that occur during the time interval associated with downlink phase continuity. In particular, by refraining from performing uplink transmissions during the time interval associated with downlink phase continuity, a capability of the base station to maintain phase continuity over a full duration of the time interval may be improved. As a result, the UE may perform joint channel estimation based on all the DMRS symbols within the DMRS bundling window, which increases performance associated with demodulating and/or decoding PDCCH and/or PDSCH transmissions associated with the bundled DMRSs.

As indicated above, FIG. 5 is provided as an example. Other examples may differ from what is described with respect to FIG. 5.

Figure 6:
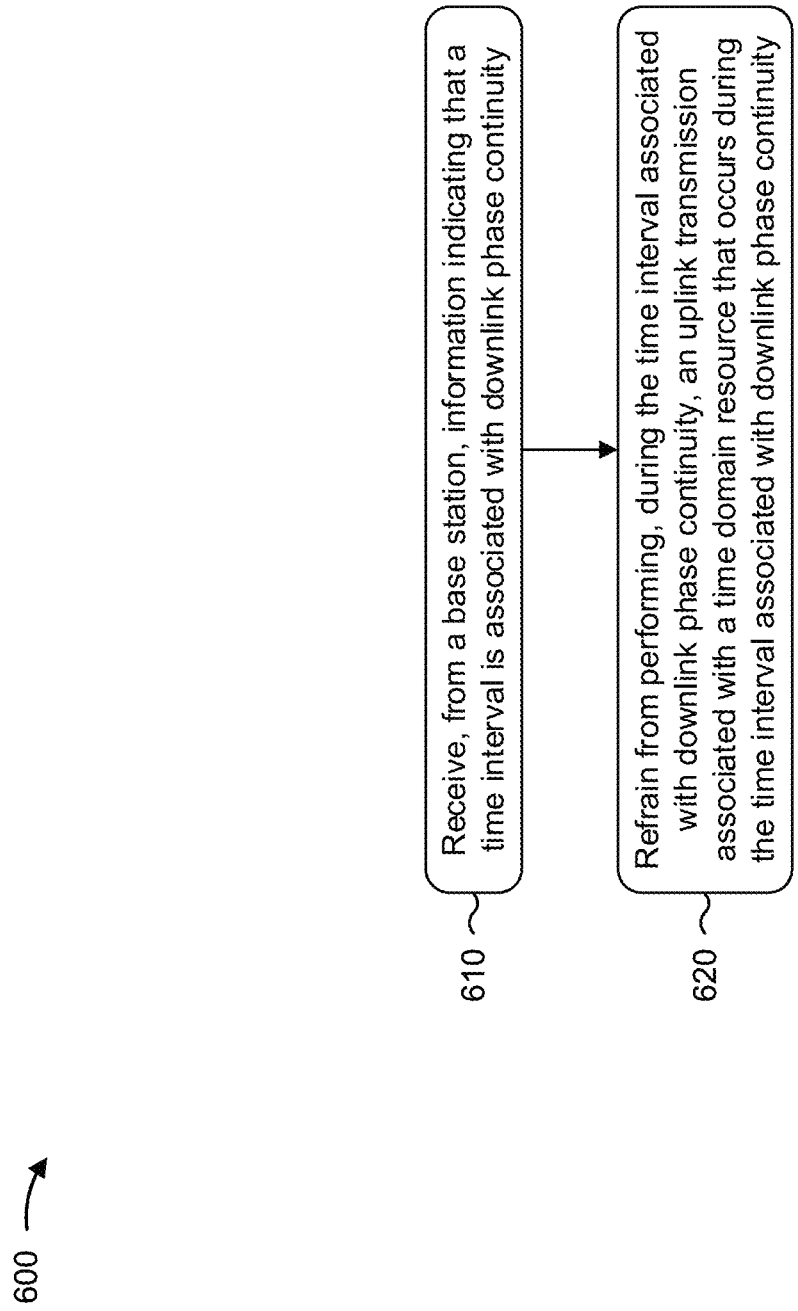
FIGS. 6-7 are diagrams illustrating example processes associated with uplink transmission handling during a time interval associated with downlink phase continuity, in accordance with the present disclosure.

FIG. 6 is a diagram illustrating an example process 600 performed, for example, by a UE, in accordance with the present disclosure. Example process 600 is an example where the UE (e.g., UE 120) performs operations associated with uplink transmission handling during time interval associated with downlink phase continuity.

As shown in FIG. 6, in some aspects, process 600 may include receiving, from a base station, information indicating that a time interval is associated with downlink phase continuity (block 610). For example, the UE (e.g., using communication manager 140 and/or reception component 802, depicted in FIG. 8) may receive, from a base station, information indicating that a time interval is associated with downlink phase continuity, as described above.

As further shown in FIG. 6, in some aspects, process 600 may include refraining from performing, during the time interval associated with downlink phase continuity, an uplink transmission associated with a time domain resource that occurs during the time interval associated with downlink phase continuity (block 620). For example, the UE (e.g., using communication manager 140 and/or channel estimation component 808, depicted in FIG. 8) may refrain from performing, during the time interval associated with downlink phase continuity, an uplink transmission associated with a time domain resource that occurs during the time interval associated with downlink phase continuity, as described above.

Process 600 may include additional aspects, such as any single aspect or any combination of aspects described below and/or in connection with one or more other processes described elsewhere herein.

In a first aspect, process 600 incudes receiving, based at least in part on the information indicating that the time interval is associated with downlink phase continuity, one or more of multiple downlink DMRSs that are bundled in a time domain or multiple PDSCH repetitions during the time interval associated with downlink phase continuity.

In a second aspect, alone or in combination with the first aspect, refraining from performing the uplink transmission includes dropping the uplink transmission.

In a third aspect, alone or in combination with one or more of the first and second aspects, refraining from performing the uplink transmission includes postponing the uplink transmission until the time interval associated with downlink phase continuity has elapsed.

In a fourth aspect, alone or in combination with one or more of the first through third aspects, process 600 includes receiving an RRC configuration that includes an indication to skip or postpone uplink transmissions during the time interval associated with downlink phase continuity.

In a fifth aspect, alone or in combination with one or more of the first through fourth aspects, the RRC configuration is associated with one or more of a CG uplink configuration, an SPS configuration, or a PUCCH resource set configuration.

In a sixth aspect, alone or in combination with one or more of the first through fifth aspects, process 600 includes receiving DCI that carries an indication to skip or postpone uplink transmissions during the time interval associated with downlink phase continuity.

In a seventh aspect, alone or in combination with one or more of the first through sixth aspects, the DCI that carries the indication to skip or postpone uplink transmissions during the time interval associated with downlink phase continuity includes information to activate an SPS configuration or schedule a PDSCH with multiple repetitions.

In an eighth aspect, alone or in combination with one or more of the first through seventh aspects, refraining from performing the uplink transmission is based at least in part on a priority for a logical channel associated with the uplink transmission failing to satisfy a threshold.

In a ninth aspect, alone or in combination with one or more of the first through eighth aspects, the uplink transmission includes a CG uplink transmission, an SR, or an SPS PUCCH transmission.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
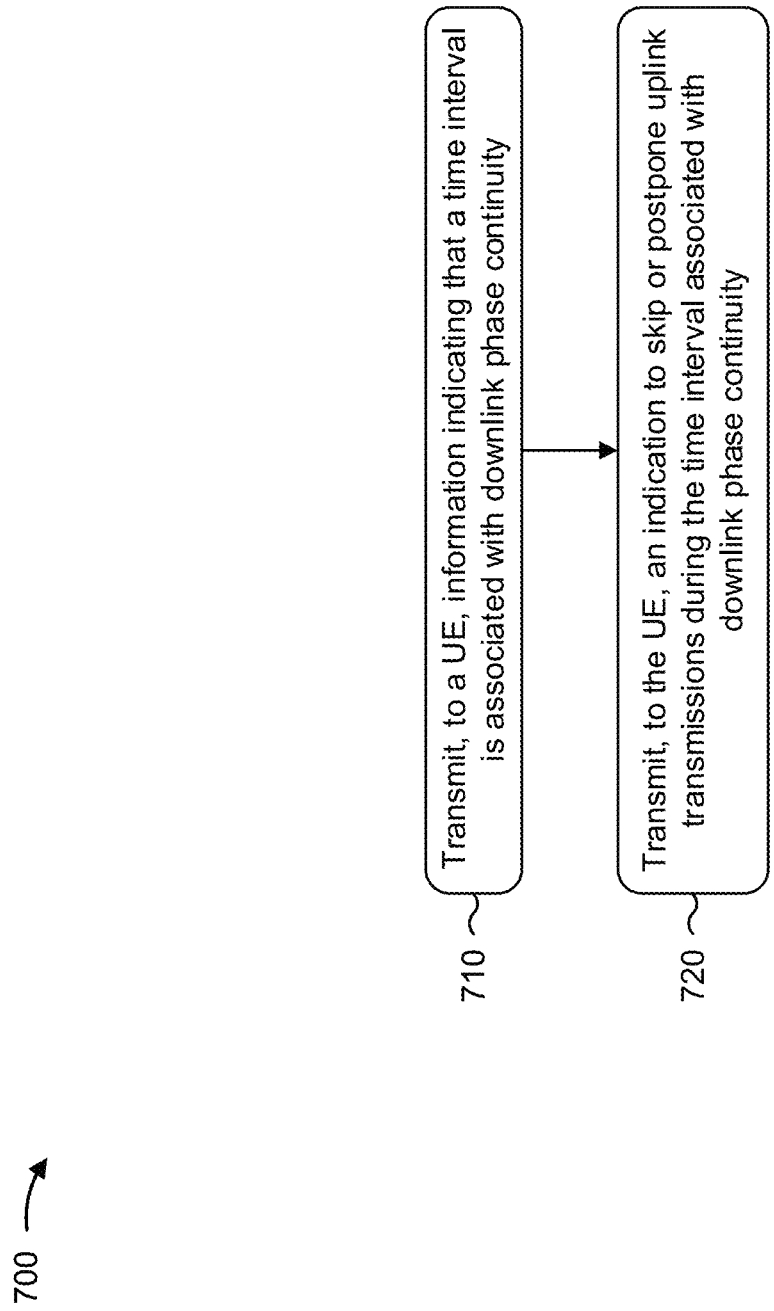

FIG. 7 is a diagram illustrating an example process 700 performed, for example, by a base station, in accordance with the present disclosure. Example process 700 is an example where the base station (e.g., base station 110) performs operations associated with uplink transmission handling during time interval associated with downlink phase continuity.

As shown in FIG. 7, in some aspects, process 700 may include transmitting, to a UE, information indicating that a time interval is associated with downlink phase continuity (block 710). For example, the base station (e.g., using communication manager 150 and/or transmission component 904, depicted in FIG. 9) may transmit, to a UE, information indicating that a time interval is associated with downlink phase continuity, as described above.

As further shown in FIG. 7, in some aspects, process 700 may include transmitting, to the UE, an indication to skip or postpone uplink transmissions during the time interval associated with downlink phase continuity (block 720). For example, the base station (e.g., using communication manager 150 and/or transmission component 904, depicted in FIG. 9) may transmit, to the UE, an indication to skip or postpone uplink transmissions during the time interval associated with downlink phase continuity, as described above.

Process 700 may include additional aspects, such as any single aspect or any combination of aspects described below and/or in connection with one or more other processes described elsewhere herein.

In a first aspect, the indication includes an instruction for the UE to refrain from performing, during the time interval associated with downlink phase continuity, an uplink transmission associated with a time domain resource that occurs during the time interval associated with downlink phase continuity.

In a second aspect, alone or in combination with the first aspect, process 700 includes transmitting, to the UE based at least in part on the information indicating that the time interval is associated with downlink phase continuity, one or more of multiple downlink DMRSs that are bundled in a time domain or multiple PDSCH repetitions during the time interval associated with downlink phase continuity.

In a third aspect, alone or in combination with one or more of the first and second aspects, the indication to skip or postpone uplink transmissions during the time interval associated with downlink phase continuity is included in an RRC configuration.

In a fourth aspect, alone or in combination with one or more of the first through third aspects, the indication to skip or postpone uplink transmissions during the time interval associated with downlink phase continuity is included in DCI.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
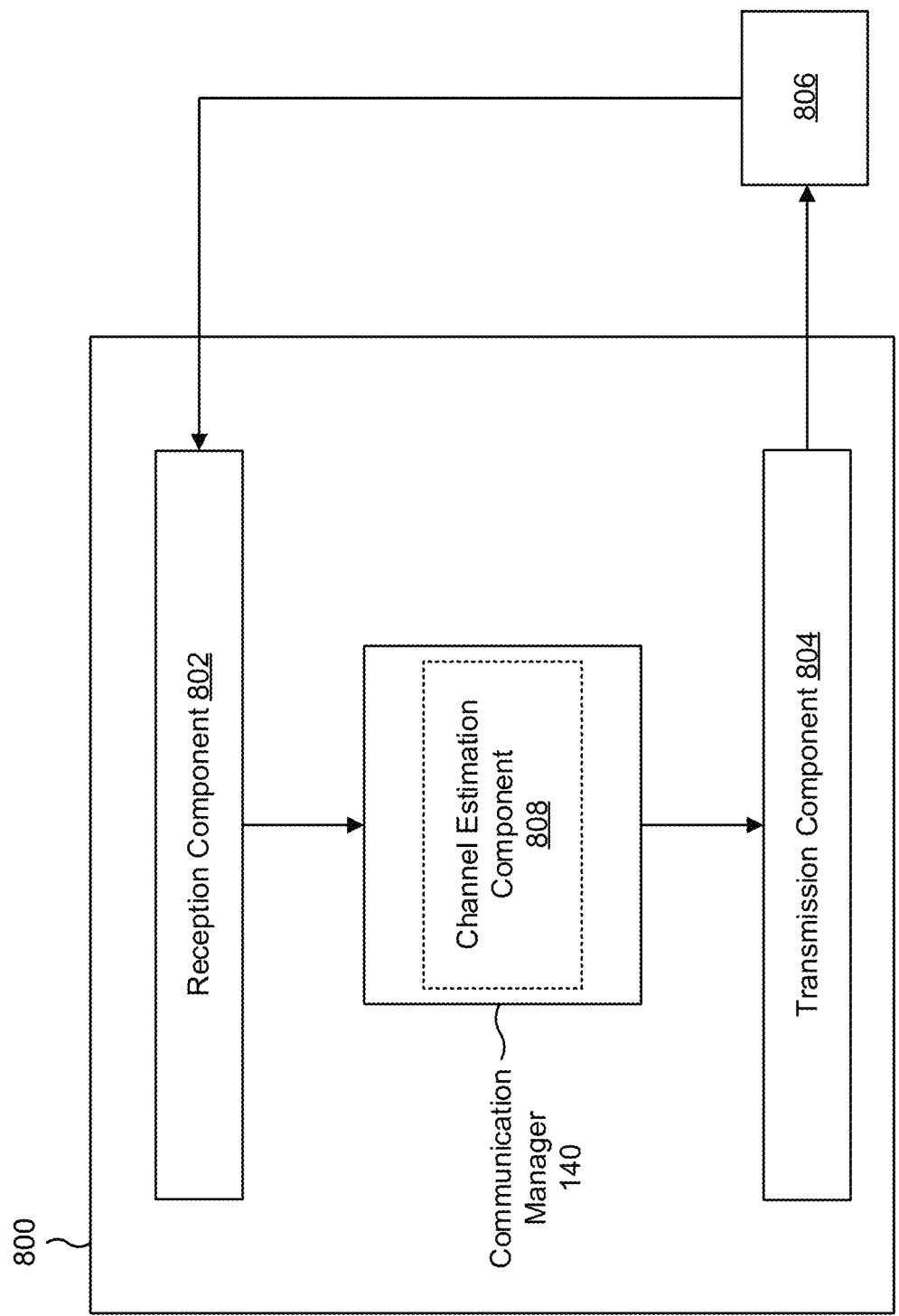
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a channel estimation component 808, among other examples.

In some aspects, the apparatus 800 may be configured to perform one or more operations described herein in connection with FIG. 5. Additionally, or alternatively, the apparatus 800 may be configured to perform one or more processes described herein, such as process 60 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive, from a base station, information indicating that a time interval is associated with downlink phase continuity. The channel estimation component 808 may refrain from performing, or may cause transmission component 804 to refrain from performing, during the time interval associated with downlink phase continuity, an uplink transmission associated with a time domain resource that occurs during the time interval associated with downlink phase continuity.

The reception component 802 may receive an RRC configuration that includes an indication to skip or postpone uplink transmissions during the time interval associated with downlink phase continuity.

The reception component 802 may receive DCI that carries an indication to skip or postpone uplink transmissions during the time interval associated with downlink phase continuity.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
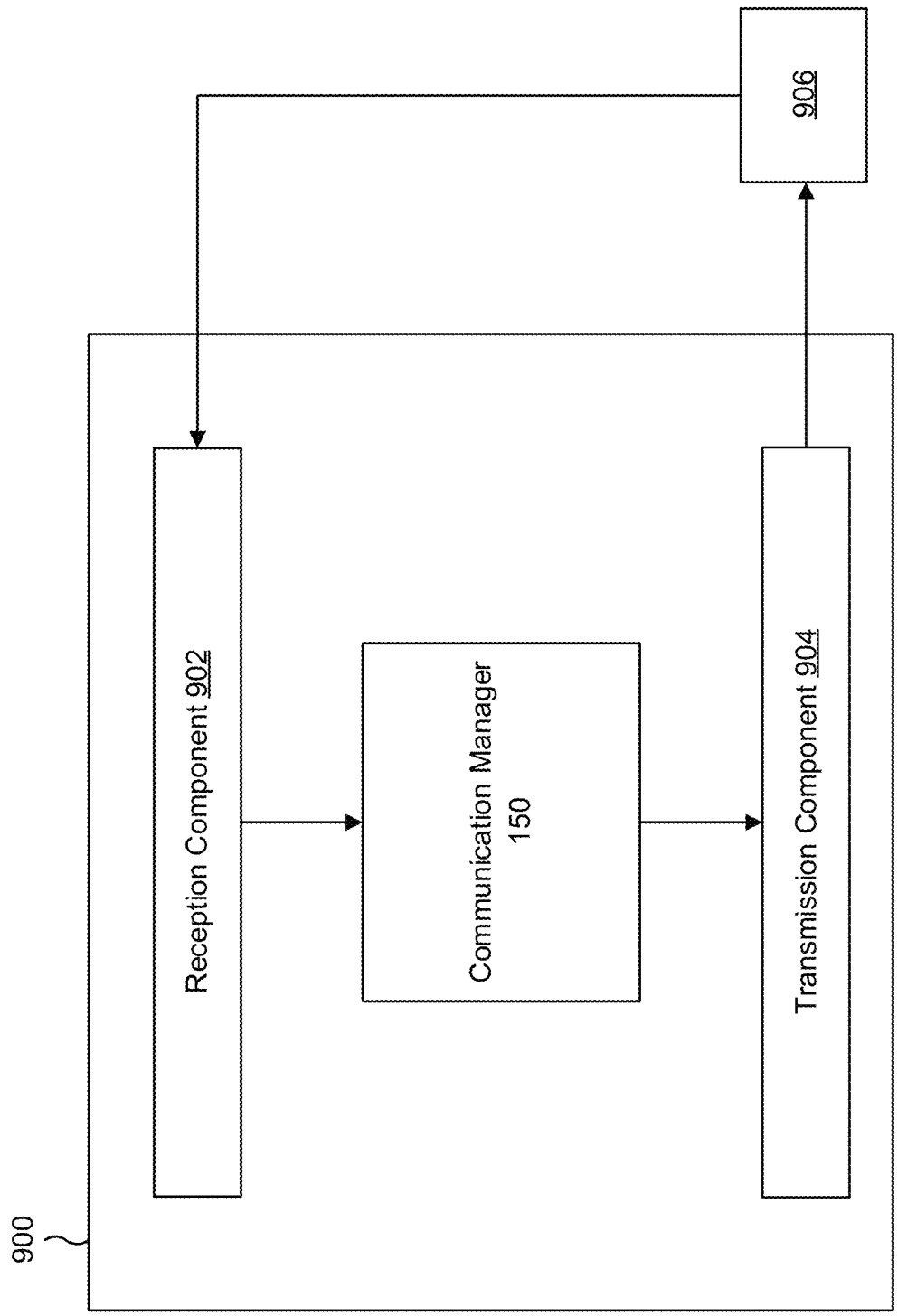

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit, to a UE, information indicating that a time interval is associated with downlink phase continuity. The transmission component 904 may transmit, to the UE, an indication to skip or postpone uplink transmissions during the time interval associated with downlink phase continuity.

The transmission component 904 may transmit, to the UE based at least in part on the information indicating that the time interval is associated with downlink phase continuity, one or more of multiple downlink demodulation reference signals that are bundled in a time domain or multiple physical downlink shared channel repetitions during the time interval associated with downlink phase continuity.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving, from a base station, information indicating that a time interval is associated with downlink phase continuity; and refraining from performing, during the time interval associated with downlink phase continuity, an uplink transmission associated with a time domain resource that occurs during the time interval associated with downlink phase continuity.

Aspect 2: The method of Aspect 1, wherein the indication enables one or more of downlink DMRS bundling or PDSCH repetitions during the time interval associated with downlink phase continuity.

Aspect 3: The method of any of Aspects 1-2, wherein refraining from performing the uplink transmission includes dropping the uplink transmission.

Aspect 4: The method of any of Aspects 1-2, wherein refraining from performing the uplink transmission includes postponing the uplink transmission until the time interval associated with downlink phase continuity has elapsed.

Aspect 5: The method of any of Aspects 1-4, further comprising: receiving an RRC configuration that includes an indication to skip or postpone uplink transmissions during the time interval associated with downlink phase continuity.

Aspect 6: The method of Aspect 5, wherein the RRC configuration is associated with one or more of a CG uplink configuration, an SPS configuration, or a PUCCH resource set configuration.

Aspect 7: The method of any of Aspects 1-6, further comprising: receiving DCI that carries an indication to skip or postpone uplink transmissions during the time interval associated with downlink phase continuity.

Aspect 8: The method of Aspect 7, wherein the DCI that carries the indication to skip or postpone uplink transmissions during the time interval associated with downlink phase continuity includes information to activate an SPS configuration or schedule a PDSCH with multiple repetitions.

Aspect 9: The method of any of Aspects 1-8, wherein refraining from performing the uplink transmission is based at least in part on a priority for a logical channel associated with the uplink transmission.

Aspect 10: The method of any of Aspects 1-9, wherein the uplink transmission includes a CG uplink transmission, an SR, or an SPS PUCCH transmission.

Aspect 11: A method of wireless communication performed by a base station, comprising: transmitting, to a UE, information indicating that a time interval is associated with downlink phase continuity; and transmitting, to the UE, an indication to skip or postpone uplink transmissions during the time interval associated with downlink phase continuity.

Aspect 12: The method of Aspect 11, wherein the indication includes an instruction for the UE to refrain from performing, during the time interval associated with downlink phase continuity, an uplink transmission associated with a time domain resource that occurs during the time interval associated with downlink phase continuity.

Aspect 13: The method of any of aspects 11-12, further comprising: transmitting, to the UE based at least in part on the information indicating that the time interval is associated with downlink phase continuity, one or more of multiple downlink DMRSs that are bundled in a time domain or multiple PDSCH repetitions during the time interval associated with downlink phase continuity.

Aspect 14: The method of any of Aspects 1-13, wherein the indication to skip or postpone uplink transmissions during the time interval associated with downlink phase continuity is included in an RRC configuration.

Aspect 15: The method of any of Aspects 1-13, wherein the indication to skip or postpone uplink transmissions during the time interval associated with downlink phase continuity is included in DCI.

Aspect 16: An apparatus for wireless communication at a device, comprising a processor; memory coupled with the processor; and instructions stored in the memory and executable by the processor to cause the apparatus to perform the method of one or more of Aspects 1-10.

Aspect 17: A device for wireless communication, comprising a memory and one or more processors coupled to the memory, the one or more processors configured to perform the method of one or more of Aspects 1-10.

Aspect 18: An apparatus for wireless communication, comprising at least one means for performing the method of one or more of Aspects 1-10.

Aspect 19: A non-transitory computer-readable medium storing code for wireless communication, the code comprising instructions executable by a processor to perform the method of one or more of Aspects 1-10.

Aspect 20: A non-transitory computer-readable medium storing a set of instructions for wireless communication, the set of instructions comprising one or more instructions that, when executed by one or more processors of a device, cause the device to perform the method of one or more of Aspects 1-10.

Aspect 21: An apparatus for wireless communication at a device, comprising a processor; memory coupled with the processor; and instructions stored in the memory and executable by the processor to cause the apparatus to perform the method of one or more of Aspects 11-15.

Aspect 22: A device for wireless communication, comprising a memory and one or more processors coupled to the memory, the one or more processors configured to perform the method of one or more of Aspects 11-15.

Aspect 23: An apparatus for wireless communication, comprising at least one means for performing the method of one or more of Aspects 11-15.

Aspect 24: A non-transitory computer-readable medium storing code for wireless communication, the code comprising instructions executable by a processor to perform the method of one or more of Aspects 11-15.

Aspect 25: A non-transitory computer-readable medium storing a set of instructions for wireless communication, the set of instructions comprising one or more instructions that, when executed by one or more processors of a device, cause the device to perform the method of one or more of Aspects 11-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a base station, information indicating that a time interval is associated with downlink phase continuity,
      wherein the time interval associated with downlink phase continuity comprises a downlink demodulation reference signal bundling window, during which one or more downlink transmission parameters remain the same; and
   refraining from performing, during the time interval associated with downlink phase continuity and based at least in part on the time interval being associated with downlink phase continuity, an uplink transmission associated with a time domain resource that occurs during the time interval associated with downlink phase continuity.

2. The method of claim 1, further comprising:
   receiving, based at least in part on the information indicating that the time interval is associated with downlink phase continuity, one or more of multiple downlink demodulation reference signals that are bundled in a time domain or multiple physical downlink shared channel repetitions during the time interval associated with downlink phase continuity.

3. The method of claim 1, wherein refraining from performing the uplink transmission includes dropping the uplink transmission.

4. The method of claim 1, wherein refraining from performing the uplink transmission includes postponing the uplink transmission until the time interval associated with downlink phase continuity has elapsed.

5. The method of claim 1, further comprising:
   receiving a radio resource control (RRC) configuration that includes an indication to skip or postpone uplink transmissions during the time interval associated with downlink phase continuity.

6. The method of claim 5, wherein the RRC configuration is associated with one or more of a configured grant uplink configuration, a semi-persistent scheduling configuration, or a physical uplink control channel resource set configuration.

7. The method of claim 1, further comprising:
   receiving downlink control information (DCI) that carries an indication to skip or postpone uplink transmissions during the time interval associated with downlink phase continuity.

8. The method of claim 7, wherein the DCI that carries the indication to skip or postpone uplink transmissions during the time interval associated with downlink phase continuity includes information to activate a semi-persistent scheduling configuration or schedule a physical downlink shared channel with multiple repetitions.

9. The method of claim 1, wherein refraining from performing the uplink transmission is based at least in part on a priority for a logical channel associated with the uplink transmission failing to satisfy a threshold.

10. The method of claim 1, wherein the uplink transmission comprises a configured uplink transmission that includes a configured grant uplink transmission, a scheduling request, or a semi-persistent scheduling physical uplink control channel transmission.

11. A user equipment (UE) for wireless communication, comprising:
   a memory; and
   one or more processors, coupled to the memory, configured to:
      receive, from a base station, information indicating that a time interval is associated with downlink phase continuity,
         wherein the time interval associated with downlink phase continuity comprises a downlink demodulation reference signal bundling window, during which one or more downlink transmission parameters remain the same; and
      refrain from performing, during the time interval associated with downlink phase continuity and based at least in part on the time interval being associated with downlink phase continuity, uplink transmission associated with a time domain resource that occurs during the time interval associated with downlink phase continuity.

12. The UE of claim 11, wherein the one or more processors are further configured to:
receive, based at least in part on the information indicating that the time interval is associated with downlink phase continuity, one or more of multiple downlink demodulation reference signals that are bundled in a time domain or multiple physical downlink shared channel repetitions during the time interval associated with downlink phase continuity.

13. The UE of claim 11, wherein the one or more processors, to refrain from performing the uplink transmission, are configured to drop the uplink transmission.

14. The UE of claim 11, wherein the one or more processors, to refrain from performing the uplink transmission, are configured to postpone the uplink transmission until the time interval associated with downlink phase continuity has elapsed.

15. The UE of claim 11, wherein the one or more processors are further configured to:
receive a radio resource control (RRC) configuration that includes an indication to skip or postpone uplink transmissions during the time interval associated with downlink phase continuity.

16. The UE of claim 15, wherein the RRC configuration is associated with one or more of a configured grant uplink configuration, a semi-persistent scheduling configuration, or a physical uplink control channel resource set configuration.

17. The UE of claim 11, wherein the one or more processors are further configured to:
receive downlink control information (DCI) that carries an indication to skip or postpone uplink transmissions during the time interval associated with downlink phase continuity.

18. The UE of claim 17, wherein the DCI that carries the indication to skip or postpone uplink transmissions during the time interval associated with downlink phase continuity includes information to activate a semi-persistent scheduling configuration or schedule a physical downlink shared channel with multiple repetitions.

19. The UE of claim 11, wherein refraining from performing the uplink transmission is based at least in part on a priority for a logical channel associated with the uplink transmission failing to satisfy a threshold.

20. The UE of claim 11, wherein the uplink transmission comprises a configured uplink transmission that includes a configured grant uplink transmission, a scheduling request, or a semi-persistent scheduling physical uplink control channel transmission.

21. A method of wireless communication performed by a base station, comprising:
transmitting, to a user equipment (UE), information indicating that a time interval is associated with downlink phase continuity,
wherein the time interval associated with downlink phase continuity comprises a downlink demodulation reference signal bundling window, during which one or more downlink transmission parameters remain the same; and
transmitting, to the UE, an indication to skip or postpone uplink transmissions during the time interval associated with downlink phase continuity based at least in part on the time interval being associated with downlink phase continuity.

22. The method of claim 21, wherein the indication includes an instruction for the UE to refrain from performing, during the time interval associated with downlink phase continuity, a configured uplink transmission associated with a time domain resource that occurs during the time interval associated with downlink phase continuity.

23. The method of claim 21, further comprising:
transmitting, to the UE based at least in part on the information indicating that the time interval is associated with downlink phase continuity, one or more of multiple downlink demodulation reference signals that are bundled in a time domain or multiple physical downlink shared channel repetitions during the time interval associated with downlink phase continuity.

24. The method of claim 21, wherein the indication to skip or postpone uplink transmissions during the time interval associated with downlink phase continuity is included in a radio resource control (RRC) configuration.

25. The method of claim 21, wherein the indication to skip or postpone uplink transmissions during the time interval associated with downlink phase continuity is included in downlink control information (DCI).

26. A base station for wireless communication, comprising:
a memory; and
one or more processors, coupled to the memory, configured to:
transmit, to a user equipment (UE), information indicating that a time interval is associated with downlink phase continuity,
wherein the time interval associated with downlink phase continuity comprises a downlink demodulation reference signal bundling window, during which one or more downlink transmission parameters remain the same; and
transmit, to the UE, an indication to skip or postpone uplink transmissions during the time interval associated with downlink phase continuity based at least in part on the time interval being associated with downlink phase continuity.

27. The base station of claim 26, wherein the indication includes an instruction for the UE to refrain from performing, during the time interval associated with downlink phase continuity, a configured uplink transmission associated with a time domain resource that occurs during the time interval associated with downlink phase continuity.

28. The base station of claim 26, wherein the one or more processors are further configured to:
transmit, to the UE based at least in part on the information indicating that the time interval is associated with downlink phase continuity, one or more of multiple downlink demodulation reference signals that are bundled in a time domain or multiple physical downlink shared channel repetitions during the time interval associated with downlink phase continuity.

29. The base station of claim 26, wherein the indication to skip or postpone uplink transmissions during the time interval associated with downlink phase continuity is included in a radio resource control (RRC) configuration.

30. The base station of claim 26, wherein the indication to skip or postpone uplink transmissions during the time interval associated with downlink phase continuity is included in downlink control information (DCI).

* * * * *